May 13, 1969     D. W. DANIEL     3,443,478
GEAR SHAVING MACHINE

Filed Feb. 8, 1967                        Sheet 1 of 2

INVENTOR.
DAVID W. DANIEL
BY
ATTORNEYS

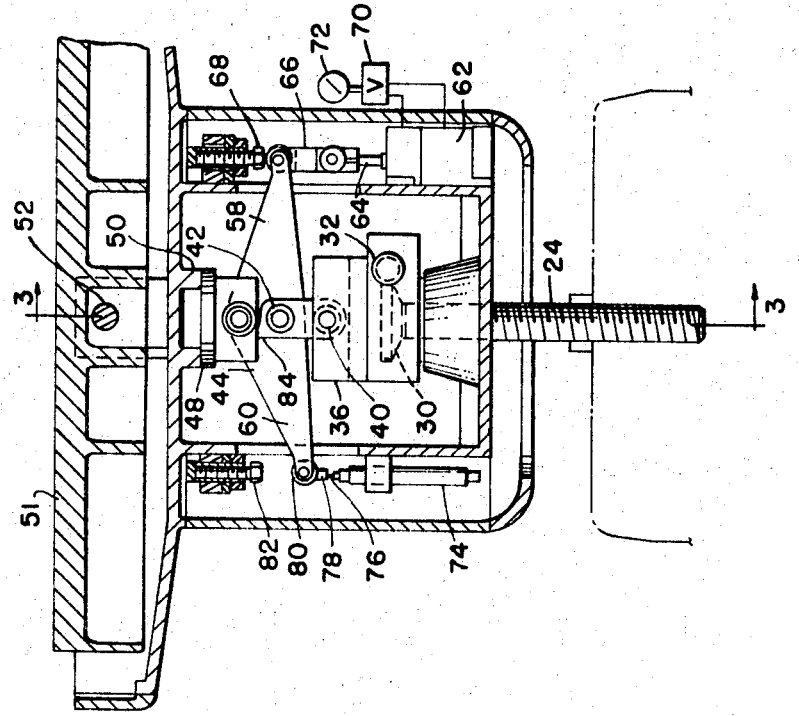
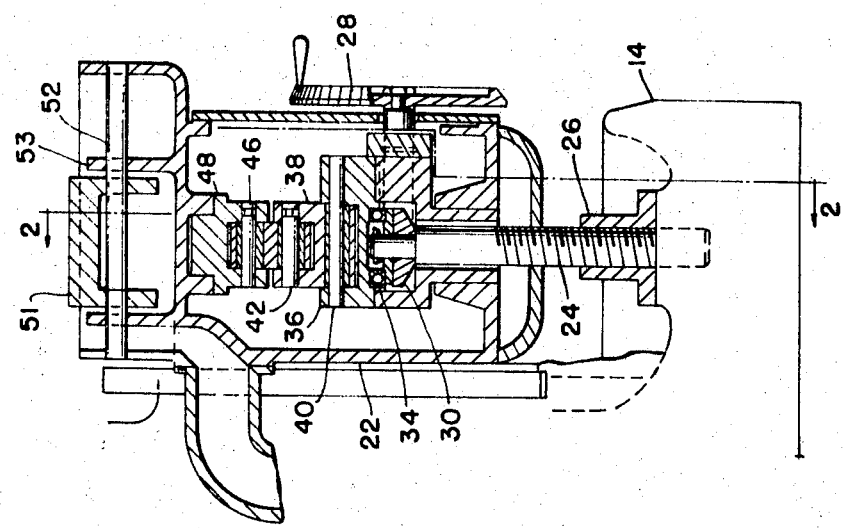

United States Patent Office 3,443,478
Patented May 13, 1969

3,443,478
GEAR SHAVING MACHINE
David W. Daniel, Birmingham, Mich., assignor, by mesne assignments, to Lear Siegler, Inc., Santa Monica, Calif. a corporation of Delaware
Filed Feb. 8, 1967, Ser. No. 614,609
Int. Cl. B23f 19/08, 21/28
U.S. Cl. 90—1.6                                                                9 Claims

ABSTRACT OF THE DISCLOSURE

A gear shaving machine for crown shaving gears in which a gear and gear-like cutter are rotated in mesh while caused to approach by a plunge feed without lateral traverse which accomplishes crowning of the gear by a relative rocking between the gear and tool which takes place at or near the depth feed.

Cross-reference to related application

This application is related to the copending application of David W. Daniel and Arthur B. Bassoff, Ser. No. 495,814, filed Oct. 14, 1965, now Patent 3,319,526 relating to a gear shaving machine.

Background of the invention

The invention relates to gear shaving of a type commonly referred to as plunge shaving in which the gear shaving tool is in the form of a gear formed of tool steel and having its teeth serrated to provide a multiplicity of cutting edges thereon. The cutter is rotated in tight mesh with a work gear, one of the parts being directly driven and the other part driven solely through the meshed rotation. The depth feed which determines the amount of material removed from the teeth of the work gear is accomplished essentially by a relative feed between the gear and tool in a direction radial of both. The feed is not accompanied with lateral strokes of traverse as has been customary in the past. The plunge feeding operation, where the teeth of the gear shaving cutter are unmodified as to tooth thickness from end to end, theoretically produces gear teeth which have greater chordal thickness at the ends than centrally thereof. In practice, the variation in thickness is negligible. Where the variation in chordal thickness is of a magnitude to be detrimental, it has in the past been eliminated by a modification of the teeth of the cutter, this modification being to form cutter teeth having a lesser chordal thickness adjacent the center than adjacent the ends thereof.

In accordance with the present invention a modification of the gear shaving machine is provided which permits the control of the tooth form of the work gear without special modification of the teeth of the cutter.

Summary of the invention

In accordance with the present invention, a gear shaving machine is provided which includes supports for mounting a work gear and a gear shaving cutter in mesh with each other with their axes in space. Means are provided for effecting movement of one of the supports to cause the gear and tool to approach along a line radial of both the gear and cutter in an operation which is recognized and known in the art as a plunge feeding operation.

In accordance with the present invention, one of the gear shaped parts, either the cutter or the gear, is rocked about a predetermined axis, preferably perpendicular to and spaced laterally from the axis of the gear, in both directions in substantially uniform amounts from an intermediate position so as to remove excess material from adjacent the ends of the gear teeth, thus producing a crowned tooth. The amount of crown is of course determinable by the amount of rocking. The rocking may take place in its entirety while the gear and cutter are at the inner end of the relative depth feed, or it may be initiated just prior to completion of depth feed and continue during initial outfeed.

Details and features of the invention will become apparent as the description proceeds, especially when taken in conjunction with the accompanying drawings, illustrating a preferred embodiment of the invention.

Brief description of the drawings

FIGURE 2 is an enlarged fragmentary vertical sectional view through the knee and table assembly, taken substantially on the line 2—2, FIGURE 3.

FIGURE 3 is an enlarged fragmentary sectional view, taken on the line 3—3, FIGURE 2.

Description of the preferred embodiment

Figure 1:
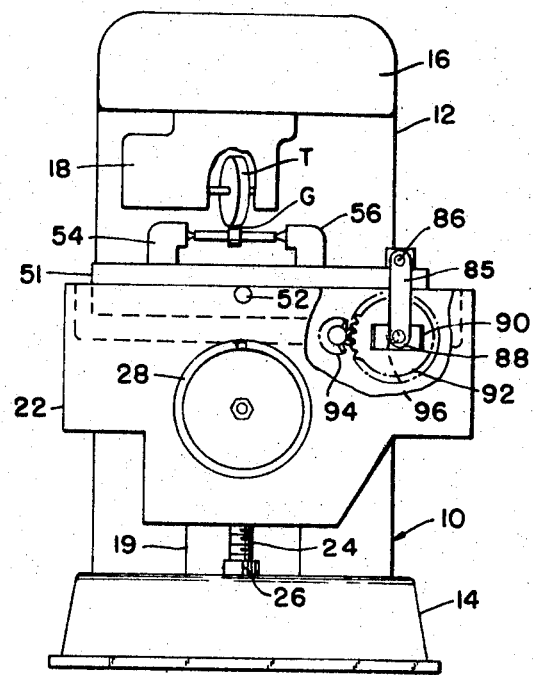
FIGURE 1 is a front elevational view of a gear shaving machine constructed in accordance with the present invention.

Referring first to FIGURE 1, the gear shaving machine comprises a frame 10 including a column 12, a forwardly extending base 14, and a forwardly extending over-hanging portion 16. A tool support 18 is suspended from the underside of the frame portion 16 and is mounted for angular adjustment about a vertical axis. A rotary gear shaving tool T is carried by the tool support 18 and is adapted to be driven in rotation by suitable mechanism connected to a motor carried by the frame portion 16.

Mounted at the front of the frame and movable vertically in ways 19 provided at the front face of the column 12 is a knee 22. Means are provided for effecting vertical movement of the knee and this means comprises a feed screw 24 rotatable in a feed nut carried supporting means indicated at 26. The feed screw 24 may be rotated by a hand wheel 28 by mechanism best seen in FIGURES 2 and 3 to which reference is now made.

Rotation of the feed screw 24 is accomplished from a worm gear 30 or otherwise secured thereto, which in turn is rotated by a worm 32 directly connected to the shaft of the hand wheel 28.

Bearing means indicated at 34 are provided above the worm gear 30 and support a two-part block assembly 36. Interconnected between the block assembly 36 and the knee or vertical slide 22 is a toggle mechanism comprising a first link 38 pivoted at its lower end by a pivot pin 40 to the block 36, and at its upper end by the pin 42 to the upper link 44. The link 44 in turn is connected by a pin 46 to a member 48 engaging the underside of a portion 50 of the knee 22.

Carried by the knee 22 is an elongated table 51 which is pivoted by a pin 52 between a pair of upstanding flanges 53 on the knee 22. The table 51 carries head and tailstocks 54 and 56, between which a work gear G is mounted for rotation.

The link 44 is in the form of an elongated member having laterally extending lever arms 58 and 60.

Carried by the knee 22 for vertical movement therewith is toggle actuating mechanism comprising a fluid piston and cylinder device indicated generally at 62 including a piston rod 64 connected by a link 66 to the outer end of the arm 58. An adjustable abutment screw 68 is carried by the knee 22 and determines the stroke of the piston in the piston and cylinder device 62. Fluid, preferably compressed air, is admitted to the cylinder at opposite sides of the piston under control of the reversing valve 70 which in turn is actuated by an adjustable timer 72 to determine the interval between application of air in a direction to elevate the knee, and reversal of the air supplied to the cylinder to cause the knee to move downwardly. It will be recalled of course that upward movement of the knee results in approach between the axes of the gear G and the tool T, and it will be apparent that this direction of relative movement is along a path perpendicular to and substantially intersecting the axes of the gear and tool.

Means are provided for controlling the rate of movement of the piston connected to the piston rod 64 in the direction which causes upward movement of the knee. This mechanism comprises a hydraulic escapement cylinder 74 carried by the knee and including a piston (not shown) connected to a piston rod 76 having a head 78 engageable with a roller 80 carried at the outer end of the arm 60. The hydraulic escapement cylinder includes a variable restriction (not shown) adjustable to control the rate at which the piston rod 76 may be depressed.

A second adjustable abutment screw 82 is provided for controlling clockwise swinging movement of the link 44 and its arms 58 and 60.

The link 38 includes an abutment shoulder 84 engageable with a cooperating surface at the lower end of the knee supporting member 48 to limit counterclockwise swinging movement of the link 44 and corresponding swinging movement of the link 38.

In operation the adjustable restriction in the hydraulic cylinder 74 is adjusted to control the rate at which the piston and cylinder device 62 is permitted to rock the link 44 to the aligned position illustrated in FIGURE 2. Due to the fact that elevation of the knee is the result of movement of the toggle mechanism into a position in which the links thereof are in substantial alignment and substantially parallel to the direction of movement of the knee 22, it will of course be apparent that the vertical movement of the knee takes place at a diminishing speed and that this speed approaches zero along a sine curve so that the final movement of the link 44 into the position illustrated in FIGURE 2 produces minimum vertical movement. In addition to the gradually decreasing speed of upward movement of the knee, a dwell period may be provided of selected duration by appropriate adjustment of the valve reversing timer 72. Thus, if the timer is set for a cycle of six seconds for example, and the variable restriction in the hydraulic cylinder 74 is set to require three seconds for the toggle actuating mechanism to effect full rocking movement of the link 44 and its arms 58 and 60, then a dwell period of three seconds is provided. Upon expiration of this dwell period the valve 70 is actuated to reverse the direction of air to the piston and cylinder device 62 and the knee or slide 22 will move downwardly at a rate determined by the rate at which air is permitted to flow out of the piston and cylinder device 62.

In accordance with the present invention, means are provided for effecting a controlled rocking movement of the table 51 in properly timed relation to vertical movement of the knee as determined by operation of the toggle mechanism. For this purpose the table 51 is connected by a link 85 which is pivoted as indicated at 86 to the table and is pivoted as indicated at 88 to the adjustable block 90 carried in a rotary gear driven member 92, the rotation of which is accomplished from a pinion 94 rotated by any suitable mechanism such for example as a separate electric motor (not shown). The block 90 is adjustably movable so as to bring the axis of the pivot 88 into desired spacing or coincidence with the axis of the pivot support 96 for the gear driven member 92. Accordingly, the block 90 and pivot 88 constitute an adjustable eccentric which will determine the amount of rocking imparted to the table 51 and hence the amount of crown provided on the teeth of the gear. Thus, the amount of rocking movement imparted to the table may be adjusted with great accuracy. Normally, the amount of rocking movement is relatively small as for example less than one inch.

The machine as heretofore described may be provided with suitable control means to effect rocking movement in timed relation to the vertical movement resulting from the toggle linkage. In a simple case, completion of the rocking movement of the toggle mechanism to the position illustrated in FIGURE 2, may actuate a limit switch which energizes the motor connected to the pinion 94 and will cause the pinion to rotate sufficiently to produce one complete rotation of the element 92 and to bring it to rest with the table 51 in a horizontal position. This will result in uniform crowning of the gear due to the rocking motion, which takes place during an interval of dwell between upward movement of the knee and the successive downward movement thereof to loading position.

Alternatively, the rocking movement may be initiated at a predetermined point during upward movement of the knee so that the table is rocked to a limiting position in one direction and back to horizontal during upward movement of the knee and the first half of the dwell period. In this case the table is rocked in the opposite direction to a limiting position and back to horizontal during the final half of the dwell period plus the initial movement of the table.

Finally, as a variation of the above, the motor driving the pinion 94 may be energized throughout each cycle to provide a continuous slow but several times repeated back and forth rocking movement during each cutting cycle.

The method performed by the apparatus may, of course, be varied by control of the energization and de-energization of the motor driving the pinion 94 and so far as the method is concerned, this may be accomplished manually. In practice of course, a predetermined program is decided upon and suitable switch means are provided and adjustments made to the rate of rocking as well as to the components of the feed and return cycles so as to produce the required results. Since the provision of switch means responsive to travel of a slide and adjustment of rates of movement are within the skill of the ordinary mechanic in the art, the disclosure herein is simplified by omitting illustration of the conventional structure employed to accomplish these functions. However, it may be observed that the roller at the right hand end of the arm 58 may engage a limit switch simultaneously with engagement of the abutment 68 to signal the initiation of a rocking cycle and that completion of the rocking cycle as determined by a complete rotation of the rotary member 92, may initiate the reverse rocking of the link 44 to accomplish the return stroke of the slide.

The drawings and the foregoing specification constitute a description of the improved gear shaving cutter in such full, clear, concise and exact terms as to enable any person skilled in the art to practice the invention, the scope of which is indicated by the appended claims.

What I claim as my invention is:

1. A machine for crown shaving gears in which a gear-like member and a gear-like cutter member are meshed by a plunge feed, rotated without movement laterally of the direction of said plunge feeding, and relative rocking movement between said members is provided, comprising a frame, a first rotary support on said frame for one of said gear-like members, a slide on said frame, a rocking table pivoted to said slide, a second rotary support on said table for the other gear-like member in mesh with said one gear-like member with their axes crossed, means for driving one of said gear-like members in rotation, feed means for moving said slide in a direction perpendicular to the axes of both gear-like members in a feeding stroke and a return stroke, and means interposed between said slide and said table for effecting rocking movement of said table in timed relation to feeding and return movement of said slide.

2. A machine as defined in claim 1 in which the gear-like member on said table is a work gear, and in which the pivot axis of said table is perpendicular to the axis of rotation of said second support and spaced from said axis at the opposite side thereof from said first support.

3. A machine as defined in claim 2 which the means for effecting rocking movement of said table comprises an eccentric driver and separate motor means for effecting rotation thereof.

4. A machine as defined in claim 3 comprising switch means for controlling said motor means responsive to movement of said slide.

5. The method of crown shaving gears in conjunction with plunge shaving which comprises rotating a gear and gear-like cutter in mesh at crossed axes, providing a depth feed by relatively moving said gear and cutter in approach and return strokes in a direction perpendicular to the axes of both said gear and cutter while preventing relatively lateral bodily movement therebetween, and providing a rocking motion between the gear and cutter in timed relation to the feed and return strokes.

6. The method as defined in claim 5 in which the rocking movement comprises a complete back and forth movement from an initial intermediate position to a limiting position in one direction through the intermediate position to a limiting position in the opposite direction, and back to the intermediate position.

7. The method as defined in claim 6 in which the rocking movement as defined therein is initiated upon completion of the feeding stroke and is terminated prior to initiation of the return stroke.

8. The method as defined in claim 6 in which the rocking motion is initiated prior to completion of the feeding stroke and is terminated after initiation of the return stroke.

9. The method as defined in claim 6 in which the rocking movement comprises a multiplicity of complete back and forth rocking movements which are initiated upon initiation of the feeding stroke and which continue until termination of the return stroke.

References Cited

UNITED STATES PATENTS

| | | | |
|---|---|---|---|
| 2,319,117 | 5/1943 | Drummond | 90—1.6 X |
| 2,542,569 | 2/1951 | Praeg | 90—1.6 |
| 3,319,526 | 5/1967 | Daniel et al. | 90—1.6 |

ANDREW R. JUHASZ, *Primary Examiner.*

G. WEIDENFELD, *Assistant Examiner.*

U.S. Cl. X.R.

90—1.4